Figure 1:
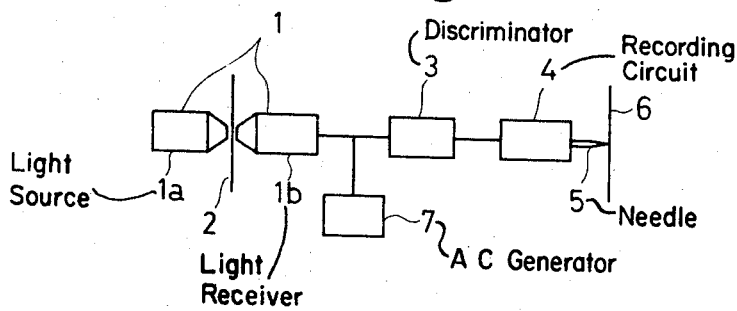

United States Patent [19]

Sakurai et al.

[11] 3,711,207
[45] Jan. 16, 1973

[54] ISODENSITY RECORDING SYSTEM

[75] Inventors: Isao Sakurai; Minoru Okumura, both of Hachioji-shi, Tokyo, Japan

[73] Assignee: Konishiroku Photo Industry Co., Ltd., Tokyo, Japan

[22] Filed: Dec. 16, 1970

[21] Appl. No.: 98,555

[30] Foreign Application Priority Data

Dec. 24, 1969 Japan..............................44/103403

[52] U.S. Cl................356/202, 346/33 A, 346/33 S, 356/203
[51] Int. Cl........................G01n 21/06, G01n 21/22
[58] Field of Search...356/201, 202, 203; 250/219 Q; 346/33 A, 33 S; 178/6.6, 6.7, 6.8

[56] References Cited

UNITED STATES PATENTS

| 2,501,790 | 3/1950 | Silverman | 346/33 S |
| 2,796,314 | 6/1957 | Bishop et al. | 346/33 S |
| 2,907,622 | 10/1959 | Hurvitz | 346/33 S |
| 2,962,549 | 11/1960 | Fricks | 346/33 A |
| 3,424,534 | 1/1969 | Miller et al. | 346/33 A |
| 3,503,689 | 3/1970 | Miller et al. | 346/33 A |
| 3,006,238 | 10/1961 | Eberline | 356/203 |

Primary Examiner—Ronald L. Wibert
Assistant Examiner—F. L. Evans
Attorney—Harry C. Bierman, Jordan B. Bierman and Bierman & Bierman

[57] ABSTRACT

An improved density recording system is described in which a material carrying a density pattern thereon is scanned two-dimensionally to measure its density, the output of the density measurement section being led to a discriminator circuit to discriminate predetermined voltages, and thereby isodensity curves are plotted, similarly to that disclosed in the copending U.S. Pat. application Ser. No. 45,952. The improvement exists in that an alternating voltage having a waveform such as sinusoidal, rectangular, o saw-tooth waveform or the like having a total amplitude larger than the width of the blind zone set up by said discriminator circuit is superposed on the output of said density measurement section, whereby the cut-away sections in isodensity curves which would occur at the curve sections which are parallel to the direction of line scanning in the case of the prior art density recording systems may be obviated and made continuous.

1 Claim, 8 Drawing Figures

ISODENSITY RECORDING SYSTEM

The present invention to a two-dimensionally scanning type of isodensitometer, and more particularly to improvements in the isodensitometer as proposed in the copending U.S. Pat. application, Ser. No. 45,952 filed on June 15, 1970 by the present Applicant and entitled "Areal Scanning Type Photo Densitometer".

In the case of the above-referred densitometer, during the density measurement, if at least a section of an isodensity curve is parallel to the direction of line scanning, the isodensity curve section cannot be recorded resulting in an incomplete diagram of isodensity curves, and therefore, said prior art densitometer had a disadvantage that the reading and interpretation of the isodensity curve becomes very hard. (With respect to this point, a more detailed explanation will be made later.)

The present invention has it as an object to overcome the above disadvantage and to provide a photographic density recording system which can plot a complete diagram of isodensity curves.

Figure 2:
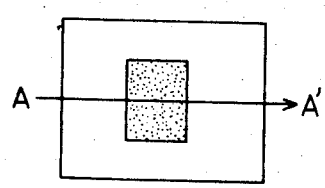
Figure 3:
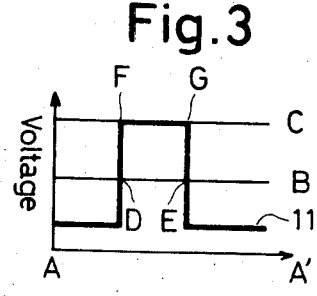
Figure 4:
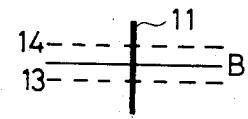
Figure 5:
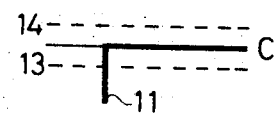
Figure 6:
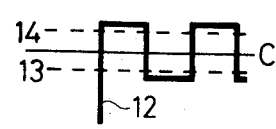
Figure 7:
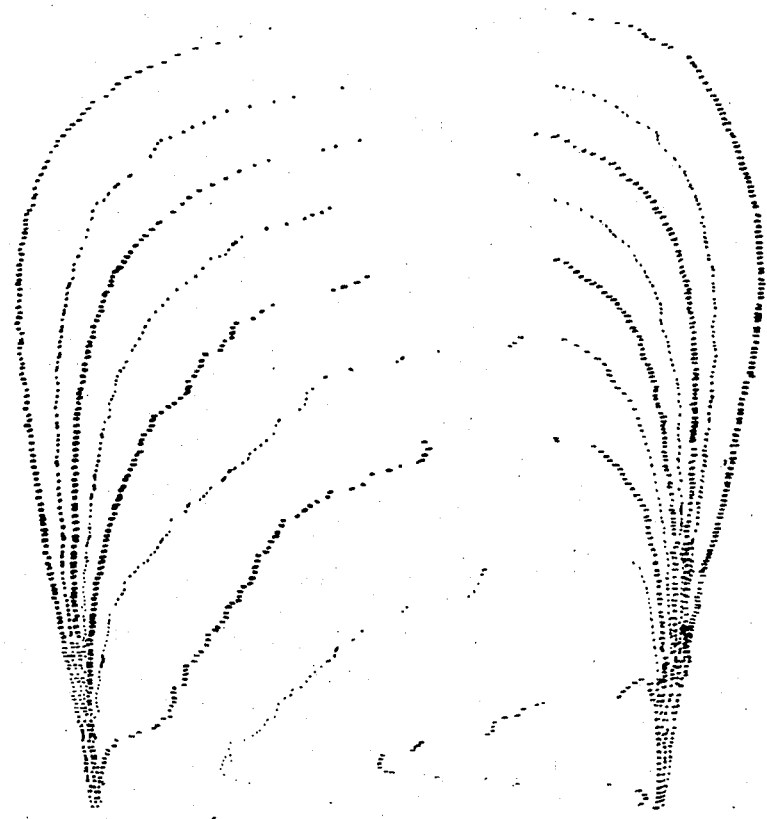
Figure 8:
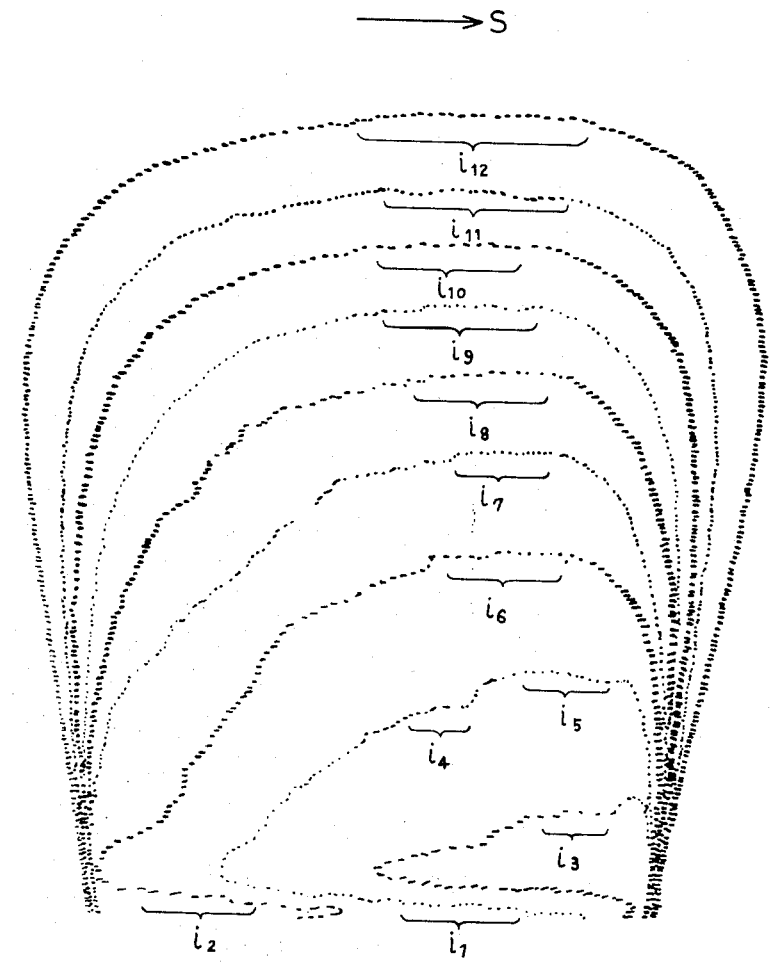

Now the present invention will be explained with reference to the accompanying drawings, wherein:

FIG. 1 is a block diagram of a recording circuit to be employed in the recording system according to the present invention, FIG. 2 is an illustration of a film having an image thereon whose density is to be measured, FIG. 3 is a diagram showing the output of a density measurement section (the density measurement section 1 in FIG. 1) when the density of the film illustrated in FIG. 2 has been measured, FIG. 4 is an enlarged view of the region in the proximity of point D in FIG. 3, FIG. 5 is an enlarged view of the region in the proximity of point F in FIG. 3, FIG. 6 is an enlarged view of the voltage output diagram to be obtained by superposing an alternating voltage over the output of the density measurement section when the density of the film illustrated in FIG. 2 has been measured, FIG. 7 is a diagram of isodensity curves to be obtained by the density recording systems in the prior art, and FIG. 8 is a diagram of isodensity curves to be obtained by the system according to the present invention.

Referring now to FIG. 1 of the drawings, reference numeral 1 designates a density measurement section which comprises a light source 1a and a photo-electric light receiver 1b. Reference numeral 2 designates a film having an image thereon whose density pattern is to be measured, numeral 3 designates a voltage discriminator circuit, numeral 4 designates a spark discharge recording circuitry, numeral 5 designates a spark discharge needle, numeral 6 designates a spark discharge recording sheet, and numeral 7 designates an alternating voltage generator.

The film 2 and the spark discharge recording sheet 6 are disposed in a predetermined relationship to the density measurement section 1 and the spark discharge needle 5, respectively, and in synchronism with scanning of the surface of the film 2 with the density measurement section 1, the spark discharge needle 5 is moved over the recording sheet 6.

The density measurement section 1 measures the density of the film 2 and thereby generates an output difference pattern in proportion to the density. This output voltage from the density measurement section 1 is passed to a voltage discriminator circuit 3. When this voltage coincides with predetermined discriminator voltages, a signal is transmitted from the voltage discriminator circuit 3 to the spark discharge recording circuitry 4, and said signal is converted in the spark discharge recording circuitry 4 into a voltage necessitated for spark discharge, so that a spark discharge occurs from the spark discharge needle 5 to the spark discharge recording sheet 6 and thereby certain discrete density values may be recorded on the spark discharge recording sheet 6.

Description will be given in the followings with respect to the correlation between the density measurement section 1 and the voltage discriminator circuit 3 in FIG. 1 upon recording isodensity curves for the film illustrated in FIG. 2.

Now it is assumed that the predetermined discriminating voltages are set at the voltages B and C in FIG. 3. If the density measurement section 1 is moved with respect to the photographic film along the line A—A' in FIG. 2 in the direction of the arrow, then the output voltage generated from the density measurement section 1 takes the form as illustrated by a thick line curve 11 in FIG. 3, said output voltage curve 11 and the discriminating voltage line B crossing with each other at two points D and E. At these points of time, a signal is transmitted from the voltage discriminator circuit 3 to the spark discharge recording circuitry 4, resulting in spark discharge recording. Explaining in more detail with respect to this point, in FIG. 4, though the signal must be transmitted from the voltage discriminator circuit 3 at the moment when the output voltage 11 from the density measurement section 1 coincides with the discriminating voltage B, actually the voltage discriminator 3 is provided with a blind zone about the discriminating voltage B at its center illustrated by an upper limit level 14 and a lower limit level 13 in FIG. 4, so that the signal is not transmitted from the voltage discriminator circuit 3 at the point of time when the output voltage 11 from the density measurement section 1 coincides with the discriminating voltage B, but instead the signal is transmitted only after the change of the output voltage 11 has further continued over the blind zone. In more particular, in case that the output from the density measurement section 1 changes from down to up in FIG. 4, the signal is transmitted from the voltage discriminator circuit 3 when the output goes across the upper limit level 14, whereas in case that it changes from up to down in FIG. 4, the signal is transmitted when it goes across the lower limit level 13.

Now if the output from the density measurement section 1 coincides with the discriminating voltage C for a certain period of time as illustrated in FIG. 5, no signal for spark discharge is transmitted from the voltage discriminating circuit 3, because the output from the density measurement section 1 does not change further exceeding the blind zone. Therefore, though dots can be recorded on the sheet 6 at the points D and E in FIG. 3, the recording of the density value corresponding to the region from the point F to the point G cannot be realized. The aforementioned blind zone of the voltage discriminator circuit 3 always occurs upon actually constructing the apparatus, and if the width of the blind zone should be made too narrow, many disadvantages would newly occur unfavorably. Thus the densitometer disclosed in said copending U.S. Pat. application, Ser. No. 45,952 had a disadvantage that a certain section of the density curve is cut away.

Therefore, the present invention is directed to the provision of a density recording system which can make discharge recording on the recording sheet 6 even if the output of the density measurement section 1 does not change across the blind zone for the discriminating voltage, that is, even in the case of the output as illustrated in FIG. 5.

According to the present invention, as shown in FIG. 1, an alternating voltage from the alternating voltage generator 7 is superposed on the output of the density measurement section 1. In case that an alternating voltage (in this example, a square wave voltage) is superposed on the output of the density measurement section, it becomes to show the form as represented by the curve 12 in FIG. 6. If the total amplitude, that is, the difference between the maximum value and the minimum value (the term "total amplitude" is used hereinafter as defined above) of the alternating voltage is chosen to be a little larger than the width of the blind zone set up by the discriminator circuit 3, since the superposed voltage 12 further changes across the blind zone, a signal is transmitted from the voltage discriminator circuit 3 to cause spark discharge recording each time said voltage goes across either the upper limit 14 upwardly or the lower limit downwardly.

In this way, it is enabled to cause spark discharge recording even for the period between the point F and the point G in FIG. 3. Though a square wave voltage was employed as the alternating voltage generated by the alternating voltage generator 7 in the above example, a sinusoidal wave, saw-tooth wave or pulse wave voltage may be equally employed. With regard to the total amplitude of the alternating voltage to be superposed, it is only required that said total amplitude should be larger than the width of the blind zone set up by the voltage discriminator circuit 3. However, if the total amplitude should become extremely large, the accuracy of the isodensity curve is lowered, and thus is not favorable. In this connection, if the total amplitude is chosen to be several times as large as the width of the blind zone set up by the discriminator circuit 3, then an isodensity curve having a thickness inversely proportioned to the density gradient of the film to be measured, may be obtained, and consequently, an advantage is brought about that the reading and interpretation of the diagram of isodensity curves becomes easier.

With regard to the frequency of the alternating voltage, if said frequency is too low, then a disadvantage is brought about that the intervals between the dots recorded on the recording sheet 6 become too large to readily read the isodensity curves, and consequently, it is necessary to select an appropriate frequency. While the alternating voltage generator 7 is equipped between the density measurement section 1 and the voltage discriminator circuit 3 in the embodiment illustrated in FIG. 1, the alternating voltage generator 7 may be provided either in the density measurement section 1 or in the voltage discriminator circuit 3 so long as it results in the superposed voltage illustrated in FIG. 6.

FIG. 7 shows a diagram of isodensity curves measured and recorded by means of the photographic densitometer according to the copending U.S. Pat. application, Ser. No. 45,952. As will be obvious from this figure, isodensity curve sections in parallel to the direction of line scanning indicated by an arrow marked (S), are cut away.

FIG. 8 shows a diagram of isodensity curves recorded by means of the system according to the present invention. As will be obvious from this figure, the isodensity curve sections $i_1, i_2, i_3 \ldots \ldots i_{12}$ in parallel to the direction of line scanning indicated by an arrow marked (S) are also plotted continuously. With reference to this figure, the density distribution can be read out and interpreted at a glance without appreciable errors.

As described, the present invention is characterized in that by superposing an alternating voltage on the output of the density measurement section 1, isodensity curves without cut-away sections are plotted, whereby it may be enabled to read out and interpret the diagram of isodensity curves without appreciable errors, and therefore, it forms an industrially quite useful invention.

While the present invention has been described above in connection to the measurement of a density pattern carried on a transparent film or transparent sheet material by means of a light source $1a$ and a photoelectric light receiver $1b$ disposed respectively on the opposite sides of the transparent sheet material, it will be readily realized by those skilled in the art that the present invention is also applicable to the measurement of a density pattern carried on an opaque sheet material such as a photographic positive image on a printing paper or any printed pattern on a paper sheet, by disposing the light source $1a$ and the light receiver $1b$ on the same side carrying the density pattern of the opaque sheet material.

What is claimed is:

1. In an isodensitometer for sensing and recording density patterns carried on film, said isodensitometer being of the type having an energy source for scanning the film, a photosensitive generating means for sensing said said energy through said film, said photosensitive generating means also generating a voltage in accordance with the intensity of energy sensed, a voltage discriminator circuit having a blind zone for comparing said voltage with a predetermined set of voltage values and for generating an output signal only when the voltage coincides with one of the voltage values in said predetermined set of voltage values and a recorder to record said output signal, the improvement which comprises:

an alternating voltage generator connected between said discriminator circuit and said photosensitive generating means for impressing an alternating voltage on said voltage, said alternating voltage having an amplitude at least equal to the width of the blind zone.

* * * * *